UNITED STATES PATENT OFFICE.

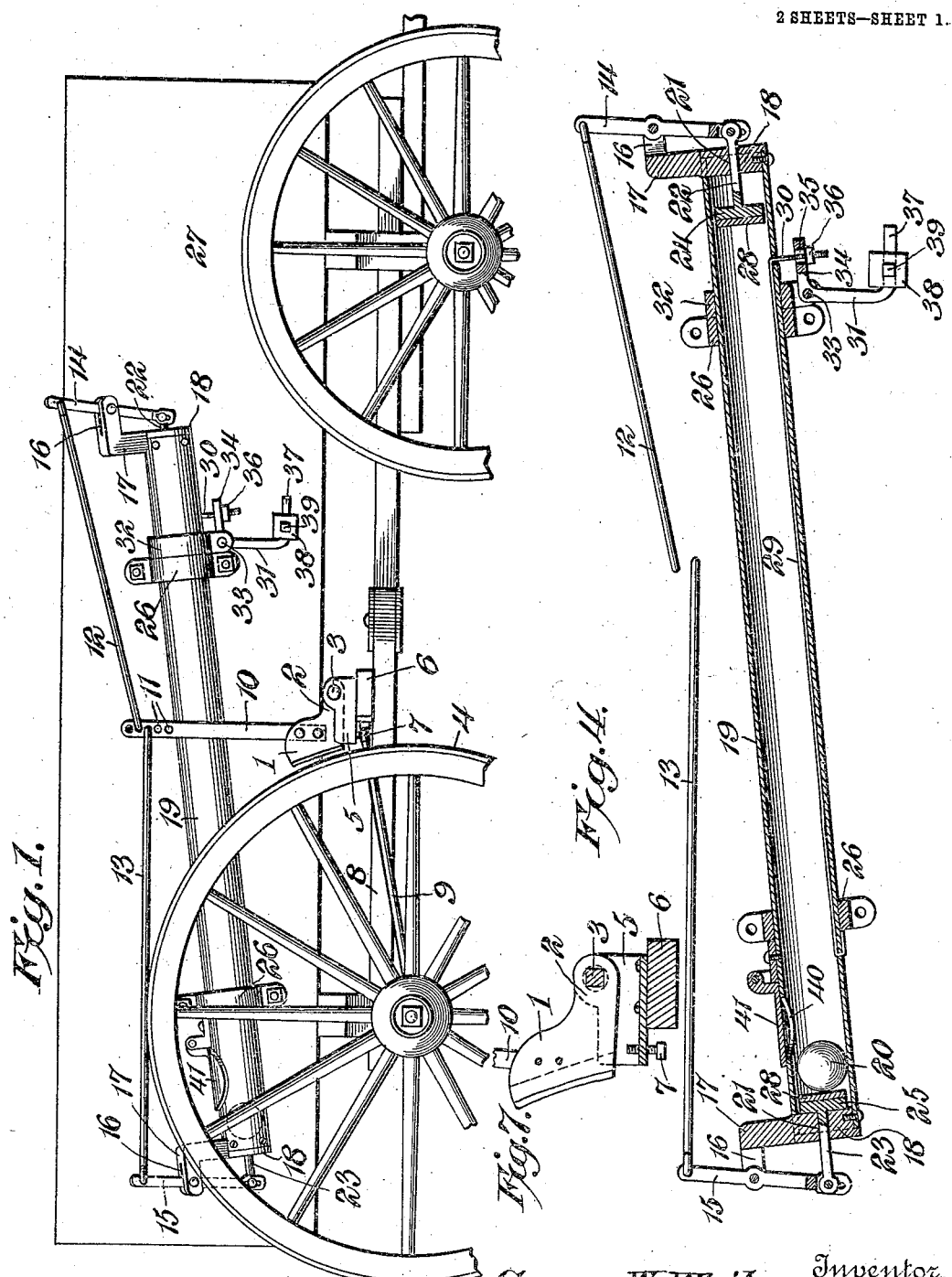

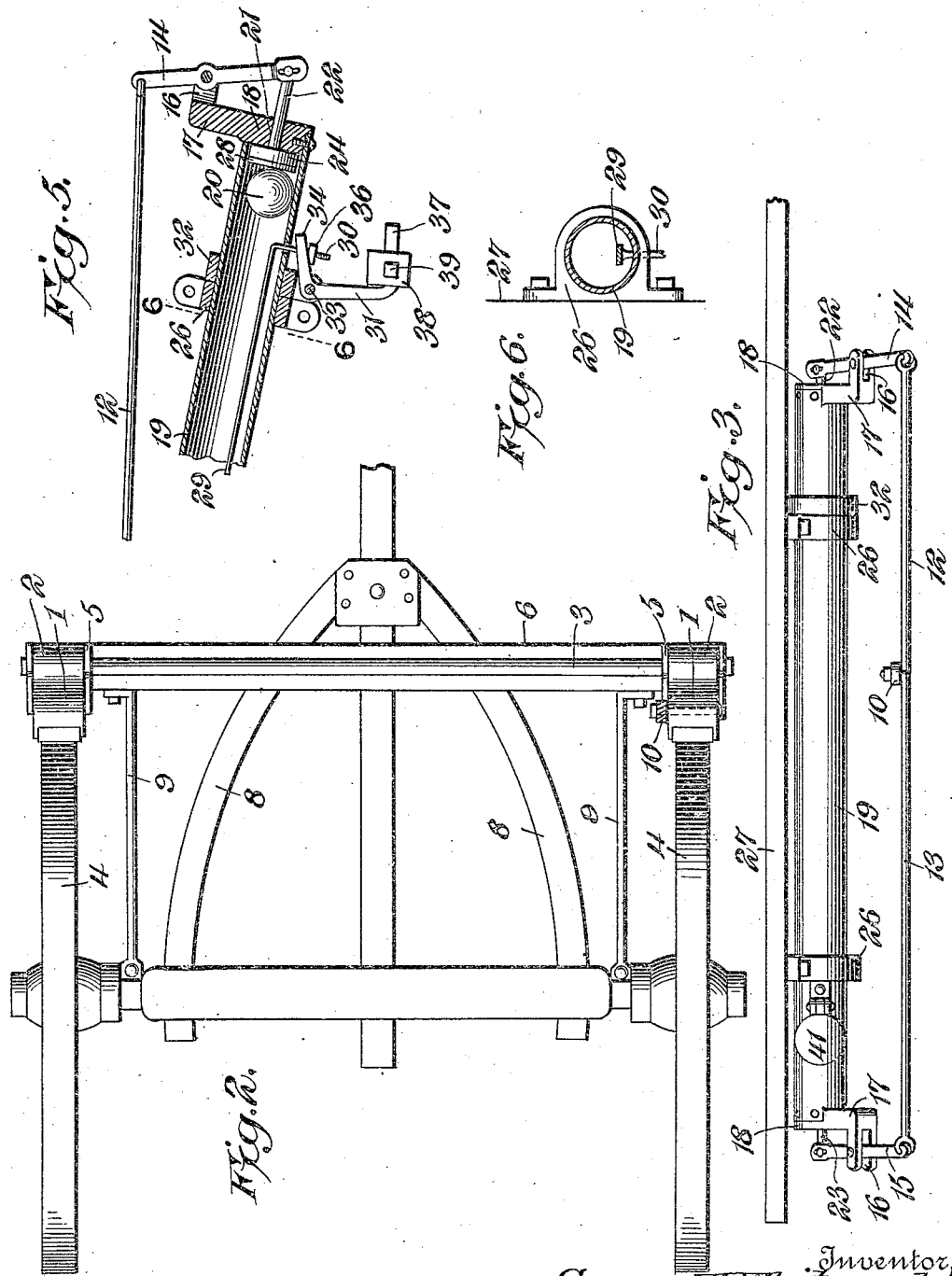

GEORGE W. WHITCOMB, OF DUFF, NEBRASKA.

AUTOMATIC VEHICLE-BRAKE.

959,279.  Specification of Letters Patent. Patented May 24, 1910.

Application filed January 14, 1909. Serial No. 472,303.

*To all whom it may concern:*

Be it known that I, GEORGE W. WHITCOMB, a citizen of the United States, residing at Duff, in the county of Rock and State of Nebraska, have invented a new and useful Automatic Vehicle-Brake, of which the following is a specification.

The invention relates to improvements in automatic vehicle brakes.

The object of the present invention is to improve the construction of automatic vehicle brakes, and to provide a simple, inexpensive and efficient gravity acting vehicle brake, adapted to be automatically applied when the vehicle descends an incline, and capable of also positively relieving the vehicle wheels of the brake shoes when the vehicle assumes a level or horizontal position.

A further object of the invention is to provide an automatic brake of this character adapted to be easily manufactured and applied to a vehicle without necessitating any alteration in the construction thereof.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a vehicle provided with an automatic gravity brake, constructed in accordance with this invention. Fig. 2 is a plan view of the rear portion of the running gear, illustrating the manner of mounting the brake shoes. Fig. 3 is a plan view of the brake shaft actuating mechanism. Fig. 4 is a longitudinal sectional view of the same, illustrating the arrangement of the parts when the vehicle body is in a horizontal position. Fig. 5 is a detail sectional view of the front portion of the mechanism, illustrating the arrangement of the parts when the vehicle body is inclined. Fig. 6 is a detail sectional view, taken substantially on the line 6—6 of Fig. 5. Fig. 7 is an enlarged detail sectional view, illustrating the manner of adjustably mounting the brake shoes.

Like numerals of reference designate corresponding parts in all the figures of the drawings.

1—1 designate brake shoes, provided with forward extensions 2 and pivoted or hinged at the front ends thereof by means of a transverse shaft 3, whereby the brake shoes are adapted to be maintained in engagement with the hind wheels 4 by the downward movement of the front portions of the wheels incident to the forward rotation of the same. When the brake shoes are thrown into engagement with the wheels, the forward rotation of the wheels will prevent the brake shoes from swinging upward out of such engagement. This construction, however, will not interfere with the free backing of the vehicle, as the upward movement of the front portions of the hind wheels incident to the backward rotation of the same will operate to throw the brake shoes upward out of engagement, and thereby enable the hind wheels to rotate freely.

The brake shoes, which may be constructed of any suitable material, are arranged in brackets 5, mounted on the ends of a transverse bar or beam 6 and each composed of a horizontal bottom portion and vertical side walls. The side walls of the bracket form a guide for the brake shoe, which is limited in its downward movement by means of an adjusting screw 7, extending through a threaded perforation of the bottom of the bracket and arranged to support the brake shoe at an elevation. The adjusting screw limits the downward movement of the brake shoe and thereby controls the frictional engagement of the same with the hind wheel.

The transverse bar or beam 6 is suitably secured to the rear hounds 8 of the running gear and is preferably braced by rods 9, extending rearwardly from the bar or beam 6 to the rear axle. These rods also operate as tie rods and prevent the bar 6 from being moved forwardly by the action of the brake shoes and enable the said bar to form a rigid support for the shaft 3.

The shaft 3 operates in the nature of a rock shaft and is equipped with an arm 10, preferably secured to one of the brake shoes, as clearly illustrated in Fig. 1 of the drawings, but it may be connected directly with the shaft, as will be readily apparent. When the arm 10 is oscillated the shoes are swung in unison toward or from the hind wheels. The upper portion of the arm 10 is provided with a plurality of perforations 11, arranged at intervals and receiving the proximate ends of the connecting rods 12 and 13, extending forwardly and rearwardly from the arm 10 to a pair of front and rear connecting levers 14 and 15. The connecting levers are pivoted in bifurcations 16 of approximately L-shaped arms 17 of heads 18 of a tubular casing 19. The tubular casing 19, which is of cylindrical form, is designed to be constructed of sheet metal, or other suitable material, and it constitutes a guide for a reciprocatory weight 20. The heads 18, which form end walls for the casing preferably consist of castings and are suitably secured in the ends of the casing, as shown, and are provided with central openings 21 through which pass stems 22 and 23 of the front and rear plungers 24 and 25. The tubular casing is secured by brackets 26, or other suitable means to the side of a wagon body 27, and is arranged in an inclined position extending upwardly and forwardly from the rear portion thereof, when the wagon body is arranged horizontally. The brackets 26, which may be of any preferred construction, are provided with circular openings to receive the tubular casing and have upper and lower ears, which are pierced by bolts, or other suitable fastening devices for securing the brackets to the wagon body.

The weight 20 is preferably in the form of a ball, and it is designed to be constructed of suitable material to give the desired weight. When the wagon body is arranged horizontally the ball occupies a position at the rear end of the casing 19, and when the vehicle is descending a hill, or other incline, the position of the wagon body and the casing 19 is changed, the casing being inclined in the opposite direction from that shown in Fig. 1, as illustrated in Fig. 5 of the drawings. This causes the weight 20 to roll to the front end of the casing 19 and engage the front plunger, which is moved outwardly. The outward movement of the front plunger swings the arm 10 rearwardly and throws the brake shoes into engagement with the hind wheels and thereby applies the brake. The front and rear plungers are preferably equipped with buffer faces 28 of felt or other suitable material to deaden the sound, and the movement of the brake shoes may be controlled by adjusting the proximate ends of the connecting rods 12 and 13.

Comparatively little force is required to throw the brake shoes into engagement with the wheels in applying the brake, but in order to obtain the full effect of the weight for throwing the brake shoes off the wheels, the weight is held at the front end of the casing by a spring catch 29 until the wagon has assumed a horizontal position. The rearward inclination of the casing will then be sufficient to cause the ball to move the rear plunger outwardly with sufficient force to throw the brake shoes off the wheels. The spring, which is arranged within the casing 19 at the bottom thereof, is secured at its rear end to the same and its front end is bent at right angles to form a depending portion or arm 30, which projects downward through an opening in the bottom of the casing 19. The spring is sufficiently light to be readily depressed by the weight 20 in the forward movement thereof, and after the ball has passed beyond it, the spring will move upward and the front end will present a shoulder to the weight and form a stop for confining the said weight at the front end of the casing. The rear end of the spring may be attached to the casing in any desired manner, and the front end of the spring is connected with a gravity acting lever 31, adapted to automatically release the weight 20 when the wagon body assumes a horizontal position. The lever 30, which is pivoted beneath the front end of the casing is supported in such position by a collar 32, fitted on the casing and provided at the bottom with spaced ears to receive the pivot 33 of the lever. The lever is provided at the top with a forwardly extending angularly related arm 34, having a slot 35 through which the front end of the spring passes. The front end of the spring is threaded and carries a nut 36, located beneath the upper arm of the lever and forming a shoulder for engagement with the same. The lower end of the lever is provided with an arm 37 carrying an adjustable weight 38, secured in its adjustment by a set screw 39. The weight maintains the upper arm of the lever in the path of the nut, and when the vehicle is inclined downwardly and forwardly in descending a grade, the nut is carried below the upper arm of the lever and the spring operates to hold the ball at the front end of the casing 19. When, however, the vehicle body assumes a horizontal position, the nut is engaged with the weighted lever, which holds the spring and causes the same to approach the bottom of the casing in such movement of the vehicle, whereby the weight 20 is released and permitted to roll back to the rear end of the casing. The catch and the automatic weight not only enable the necessary force to be obtained for throwing the brake shoes off the wheels, but the catch also prevents the weight from moving slowly backward when the casing is in a slightly inclined position. The lower arm of the lever enables the adjustable weight to be moved outward and inward in order to position the arm properly with respect to the engaging nut or member of the spring, so that the ball will be released at the desired time.

The weight 20 is introduced into the casing through an opening 40 in the top thereof, a suitable cover 41 being preferably provided. The automatic brake applying mechanism including the casing, the connections between the levers 14 and the arm 10 and the means for operating the plunger may be applied to either side of the body of a vehicle or to both sides of the same, the latter arrangement being preferable in mountainous districts where the hauling is heavy.

The brake may be applied wholly to the running gear and to either or both sides of a vehicle, if desired, as it will be found efficient either as a box or running gear brake, and will be especially advantageous when applied to hay wagons and other vehicles, where an automatic brake is desirable.

Having thus fully described my invention, what I claim as new and desire to secure by Letters Patent, is:—

1. An automatic vehicle brake including a reciprocatory weight, opposite plungers arranged in the path of the weight, a brake shoe, and means connected with the plungers and with the brake shoe for moving the latter into and out of engagement with the wheel.

2. An automatic vehicle brake comprising a tubular casing, a reciprocatory weight guided by the casing, opposite plungers arranged to be actuated by the weight, a brake shoe, and means connected with the plungers for moving the brake shoe into and out of engagement with the wheel.

3. An automatic vehicle brake comprising a tubular casing, heads arranged at the ends of the casing, plungers operating in the casing and having stems extending through the said heads, levers fulcrumed at the ends of the casing and connected with the plungers, a brake shoe, a weight slidable in the casing for actuating the plungers, and means connected with the levers for moving the brake shoe into and out of engagement with the wheel.

4. An automatic vehicle brake comprising an inclined casing designed to be mounted on a vehicle, plungers operating at the ends of the casing, a reciprocatory weight guided in the casing and arranged to actuate the plungers, opposite brake shoes, a shaft connecting the brake shoes, an arm also connected with the brake shoes, and means for connecting the arm with the said plungers.

5. An automatic vehicle brake comprising an inclined casing designed to be mounted on a vehicle, plungers operating at the ends of the casing, a reciprocatory weight guided in the casing and arranged to actuate the plungers, opposite brake shoes, a shaft connecting the brake shoes, an arm also connected with the brake shoes, levers fulcrumed at the ends of the casing and connected with the plungers, and means for connecting the levers with the said arm.

6. An automatic vehicle brake comprising a guide, a reciprocatory weight movable in the guide, a brake shoe, means actuated by the weight for moving the brake shoe into and out of engagement with the wheel, a catch arranged in the path of the weight for holding the same, and a gravity device for releasing the weight.

7. An automatic vehicle brake including a guide, a reciprocatory weight, a brake shoe, means actuated by the weight for moving the brake shoe into and out of engagement with a wheel, a catch for holding the weight, and a weighted lever arranged to automatically operate the catch for releasing the reciprocatory weight.

8. An automatic vehicle brake including a guide, a reciprocatory weight, means actuated by the weight for moving a brake shoe into and out of engagement with a wheel, a catch for holding the weight, and a weighted lever having an arm arranged to operate the catch to release the weight, said lever being provided with a weight arranged to be adjusted to change the position of the arm of the lever.

9. An automatic vehicle brake including a guide, a reciprocatory weight, means actuated by the weight for moving a brake shoe into and out of engagement with a wheel, a catch for holding the weight, a lever provided with upper and lower arms, the upper arm being arranged to release the weight, and the lower arm being provided with an adjustable weight for changing the position of the upper arm.

10. An automatic vehicle brake including a guide, a reciprocatory weight, means operated by the weight for moving a brake shoe into and out of engagement with a wheel, a spring extending along the guide in the path of the weight and having one end free and projecting beyond the guide, a gravity acting lever having an arm receiving the projecting end of the spring, and means carried by the spring and arranged to engage with the arm of the lever.

In testimony, that I claim the foregoing as my own, I have hereto affixed my signature in the presence of two witnesses.

GEORGE W. WHITCOMB.

Witnesses:
ALBERT KEMP,
J. E. HUMPHREYS.